US006816176B2

(12) United States Patent
Laffey et al.

(10) Patent No.: US 6,816,176 B2
(45) Date of Patent: Nov. 9, 2004

(54) TEMPORARILY MOVING ADJACENT OR OVERLAPPING ICONS AWAY FROM SPECIFIC ICONS BEING APPROACHED BY AN ON-SCREEN POINTER ON USER INTERACTIVE DISPLAY INTERFACES

(75) Inventors: Patrick Justin Laffey, Cedar Park, TX (US); Jessica Kelley Murillo, Hutto, TX (US); Johnny Meng-Han Shieh, Austin, TX (US); Kim-Khanh Vu Tran, Austin, TX (US); Scott Trieu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/899,616

(22) Filed: Jul. 5, 2001

(65) Prior Publication Data

US 2003/0007017 A1 Jan. 9, 2003

(51) Int. Cl.⁷ .................................................. G09G 5/00
(52) U.S. Cl. ........................ 345/860; 345/862; 345/837; 345/861; 345/835
(58) Field of Search ................................ 345/837, 856, 345/835, 859, 860, 861, 862, 767

(56) References Cited

U.S. PATENT DOCUMENTS

| | | | | |
|---|---|---|---|---|
| 5,169,342 A | * | 12/1992 | Steele et al. ................. | 434/112 |
| 5,287,448 A | * | 2/1994 | Nicol et al. .................. | 345/159 |
| 5,692,145 A | * | 11/1997 | Nakanishi .................... | 345/835 |
| 5,778,382 A | * | 7/1998 | Hatori ......................... | 707/104 |
| 6,031,531 A | * | 2/2000 | Kimble ........................ | 345/862 |
| 6,489,977 B2 | * | 12/2002 | Sone ........................... | 345/835 |
| 6,559,872 B1 | * | 5/2003 | Lehikoinen et al. ......... | 345/856 |
| 6,567,070 B1 | * | 5/2003 | Light et al. .................. | 345/157 |
| 2002/0075333 A1 | * | 6/2002 | Dutta et al. .................. | 345/862 |

* cited by examiner

*Primary Examiner*—Ba Huynh
*Assistant Examiner*—Mylinh Tran
(74) *Attorney, Agent, or Firm*—Volel Emile; J. B. Kraft; Leslie A. VanLeeuwen (57) ABSTRACT

In an interactive display interface, an implementation for setting up around each of the selectable items, e.g. icons, a perimeter zone or halo at a predetermined distance from the perimeter of the item or icon. Thus, when an icon with such a halo is approached by an on-screen pointer, e.g. cursor, there are means for moving an adjacent icon which is within this halo to a screen position beyond this predetermined distance, i.e halo. The moved adjacent icons are subsequently returned to their original positions after a set period of time or after the pointer or cursor has moved beyond the approached icon.

One aspect of this invention is directed to an icon state wherein said adjacent icons and selectable icons overlap each other and, thus, it is difficult for the user to distinguish which icon he wishes to select. For such a situation, the invention further includes means for user selection of icons which includes means for sequentially moving all other icons away from each of the overlapping icons for said predetermined period of time to thereby expose each of the overlapping icons in combination with means for sequentially enabling the user selection of each exposed icon.

24 Claims, 6 Drawing Sheets

TEMPORARILY MOVING ADJACENT OR OVERLAPPING ICONS AWAY FROM SPECIFIC ICONS BEING APPROACHED BY AN ON-SCREEN POINTER ON USER INTERACTIVE DISPLAY INTERFACES

CROSS REFERENCE

U.S. patent applications entitled: DIRECTING USERS' ATTENTION TO SPECIFIC ICONS BEING APPROACHED BY AN ON-SCREEN POINTER ON USER INTERACTIVE DISPLAY INTERFACES (Ser. No. 09/899,604) and ALTERNATE REDUCED SIZE ON-SCREEN POINTERS FOR ACCESSING SELECTABLE ICONS IN HIGH ICON DENSITY REGIONS OF USER INTERACTIVE DISPLAY INTERFACES (Ser. No. 09/899,458) having the same inventors and assignee of the present application and filed concurrently herewith and hereby incorporated by reference.

TECHNICAL FIELD

The present invention relates to user-interactive computer supported display technology and particularly to such user interactive systems and methods that are user friendly and provide computer users with an interface environment that is easy to use, even in displays that are crowded and cluttered with icons.

BACKGROUND OF RELATED ART

The past decade has been marked by a technological revolution driven by the convergence of the data processing industry with the consumer electronics industry. This advance has been even further accelerated by the extensive consumer and business involvement in the Internet over the past several years. As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

In order for the vast computer supported industries and market places to continue to thrive, it will be necessary for increasing numbers of workers and consumers who are limited in computer skills to become involved with computer interfaces.

Despite all of the great changes that have been made in the computer industry, the screen cursor controlled manually by the user still remains the primary human-computer interface. The user still commands the computer primarily through manual pointing devices such as mice, joy sticks and trackballs that control the on-screen cursor movements. It must be noted that the principles involved in such pointing devices were developed over a generation ago when most of the people involved in interfaces to computer were computer professionals who were willing to invest great amounts of time in developing computer skills. It is very possible that had computers originally been the mass consumer, business and industry implements which they are today, user interfaces that were much easier and required less skill to use would have been originally sought and developed. Nonetheless, the manually controlled cursor movement devices are our primary access for cursor control. The present invention is directed to making mice, trackballs and like cursor control devices more user friendly and effective.

Icons in Graphical User Interfaces ("GUIs") are, of course, the primary access through which the user may interactively select substantially all computer functions and data. Thus, the number of icons that the user has to contend with in the navigation of his cursor to his target icon has been increasing greatly. These may be arranged in many layers of windows. In certain portions of the users' display screen, there may be dense populations of icons. The icons may overlap or be stacked one on the other.

In addition, the users' desktop display screens have been increasing in size to thereby provide the user with the luxury of some room for icon spacing to visually separate icons. On the other hand, users are extensively using laptop computers and palm-type devices, including Personal Digital Assistants (PDAs) and even cell phone displays to supplement their desktops. Thus, the desktop displays need to be replicated on these smaller screen devices to thereby make the icons even more closely spaced. In any event, whether it be on the desktop, laptop of smaller screen device, the selection of icons or like displayed objects and items from crowded screen areas presents a problem.

SUMMARY OF THE PRESENT INVENTION

The present invention offers an implementation for the interactive selection of icons from display screen areas crowded with a high density of icons. The invention provides a user activated cursor control device, such as a trackball or mouse, that is movable in the four orthogonal directions. The control device is connected to the computer which includes means for converting the user activated orthogonal movements into cursor or pointer movements in said four directions. The key to the present invention is in the provision of means for setting up around each of the selectable items, e.g. icons, a perimeter zone or halo at a predetermined distance from the perimeter of the item or icon. Thus, when an icon with such a halo is approached by an on-screen pointer, e.g. cursor, there are means for moving any adjacent icons that are within this halo to a screen position beyond this predetermined distance, i.e halo. The moved adjacent icons are subsequently returned to their original positions after a set period of time or after the pointer or cursor has moved beyond the approached icon.

One aspect of this invention is directed to an icon state wherein said adjacent icons and selectable icons overlap each other and, thus, it is difficult for the user to distinguish which icon he wishes to select. For such a situation, the invention further includes means for user selection of icons that includes means for sequentially moving all other icons away from each of the overlapping icons for said predetermined period of time to thereby expose each of the overlapping icons in combination with means for sequentially enabling the user selection of each exposed icon.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
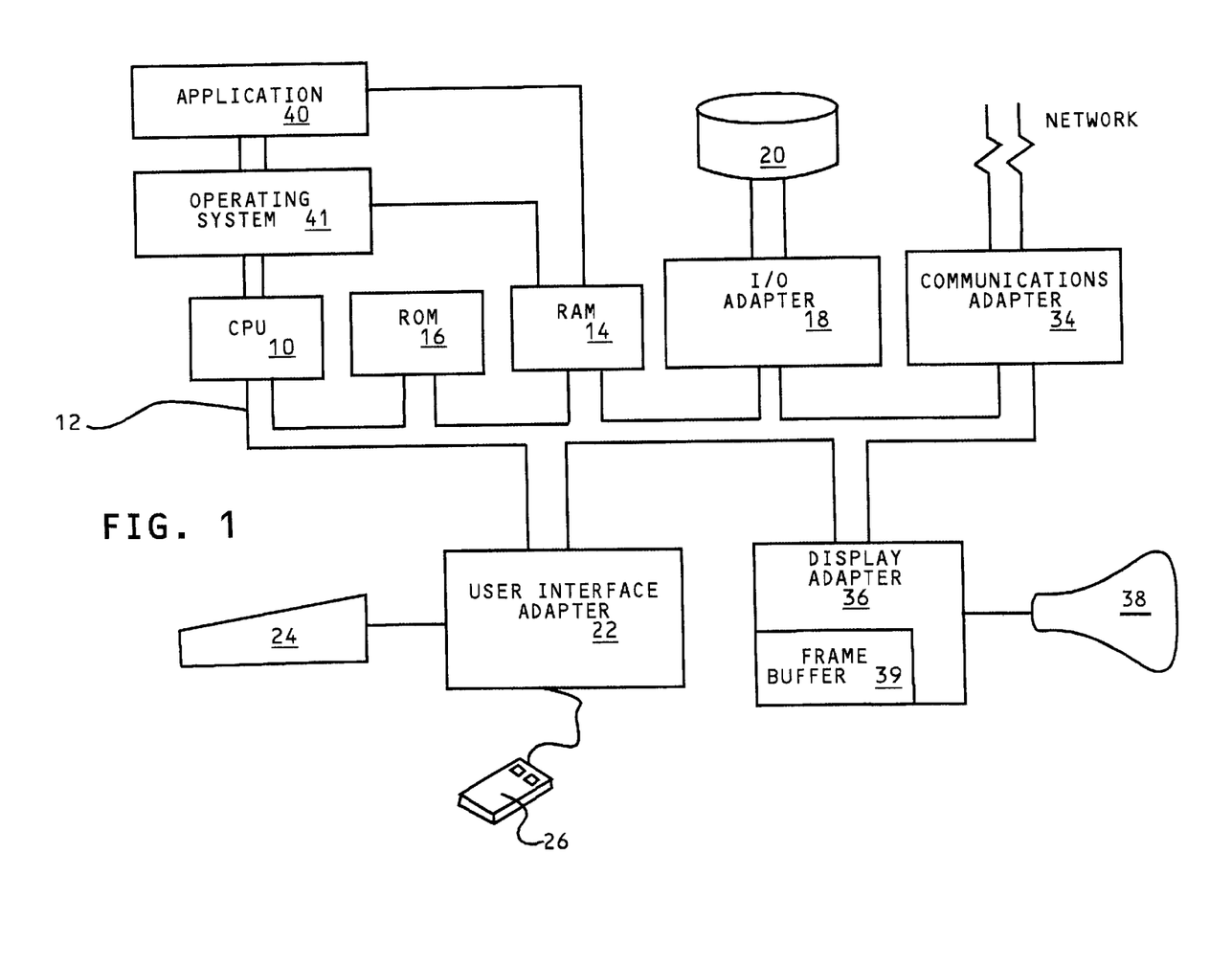
FIG. 1 is a block diagram of a generalized data processing system including a central processing unit that provides the computer controlled interactive display system which may be used in practicing the present invention.

Referring to FIG. 1, a typical data processing system is shown that may function as the computer controlled display terminal used in implementing the system of the present invention of the moving of adjacent icons within the halo of an icon being approached by a cursor in a high icon density display area. A central processing unit (CPU) 10, such as any PC microprocessor in a PC available from International Business Machines Corporation ("IBM") or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or IBM's AIX operating systems. An application program that controls the moving of adjacent icons within the halo of an icon being approached by a cursor in a high icon density display area, to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet or World Wide Web ("Web") (the terms Internet and Web are used interachangeably throughout this application). I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 2:
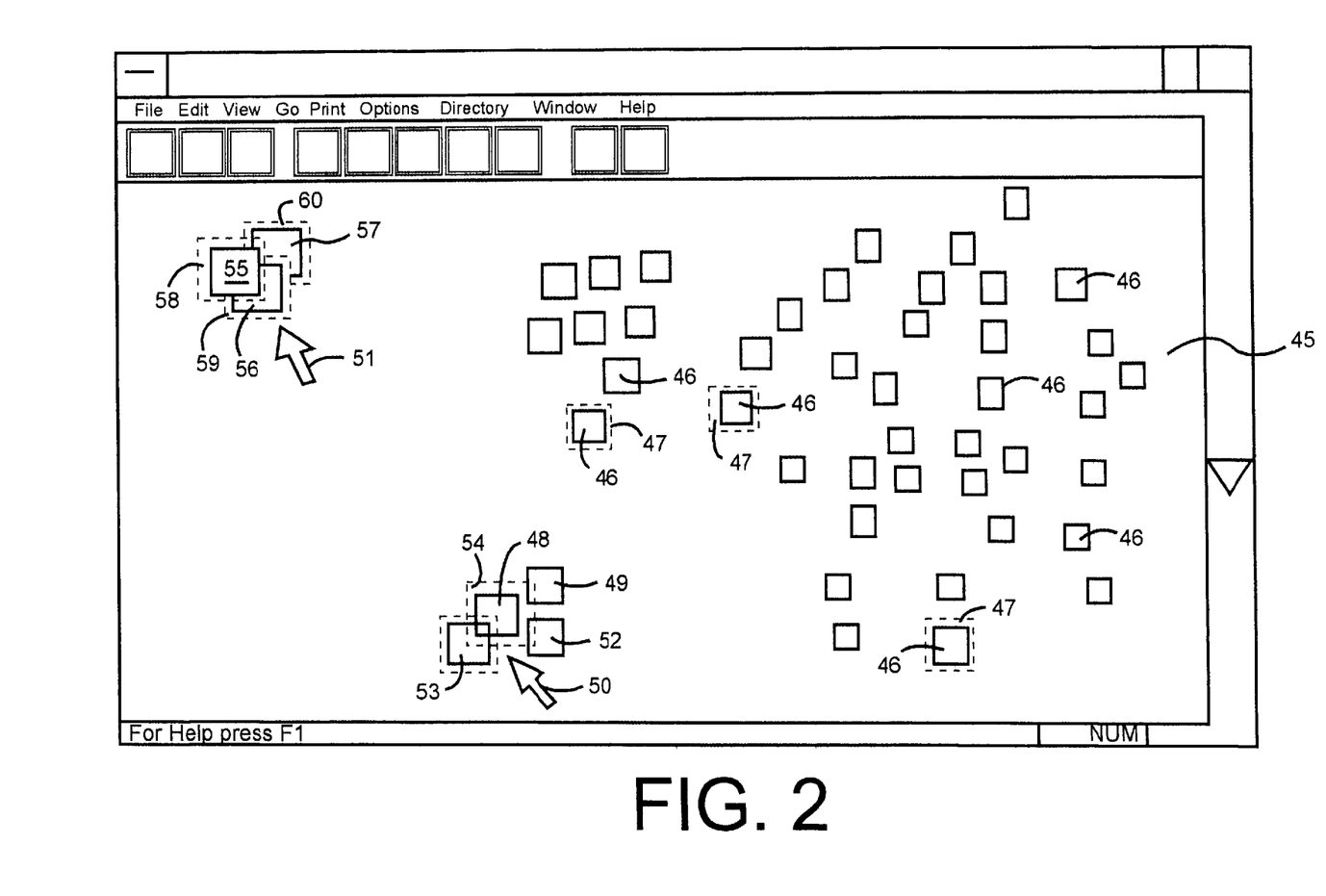
FIG. 2 is a diagrammatic view of a display screen illustrating two examples of cursor movements into target regions that are crowded with high density icon populations so as to illustrate two aspects of the invention.

With reference to FIG. 2, the display screen 45 has a great number of icons 46 (simplified to just squares for illustration). Actually the number of icons has also been minimized for this example. It is understood that there may be icons arranged in patterns of greater or lesser icon density, i.e. greater spacing between icons. Thus, as the cursor 50 or 51 is moved along and approaches an icon 46 that is adequately spaced from its adjacent icons so that a user would not be expected to encounter any difficulty in distinguishing the icon from adjacent icons, then the function of the invention which moves adjacent icons need not be invoked and the icon may be approached and selected in the standard way.

However, the icon density adjacent to the target icon may be so great that the adjacent icon moving function will need to be invoked in order to help the user distinguish his target icon. This may be accomplished by selecting a predeterminable minimum distance or spacing between icons necessary to distinguish between adjacent icons. This distance may then be considered as a halo or zone 47 around each icon 46. It should be noted that each icon can be provided with such a halo 47 but only a few illustrative halos are shown here for convenience in illustration. The halos are shown as dashed lines because they are not visible. They just represent the minimum distance or spacing between icons necessary to distinguish between adjacent icons. This distance is said to be predeterminable, it may be preset by the program developer, preferably as a default condition. However, subject to the icon size relative to the screen size, the user may be provided with interactive means to adjust or tailor this distance to suit his individual needs.

Considering now two illustrations of this invention, there would usually be a single cursor on a display screen. In FIG. 2, we have replicated the cursor so as to illustrate two different possible icon arrangements that could give rise to the present invention. Thus, cursor 51 could be considered to be cursor 50 in a different position.

Figure 3:
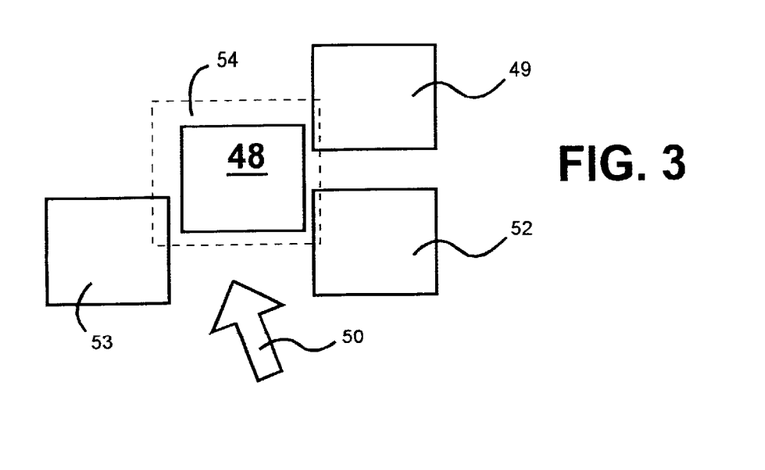
FIG. 3 is a magnified portion of the view of FIG. 2 illustrating the cursor point approaching an icon wherein there are three adjacent icons within the halo at a predetermined distance from the perimeter of the approached icon.
Figure 4:
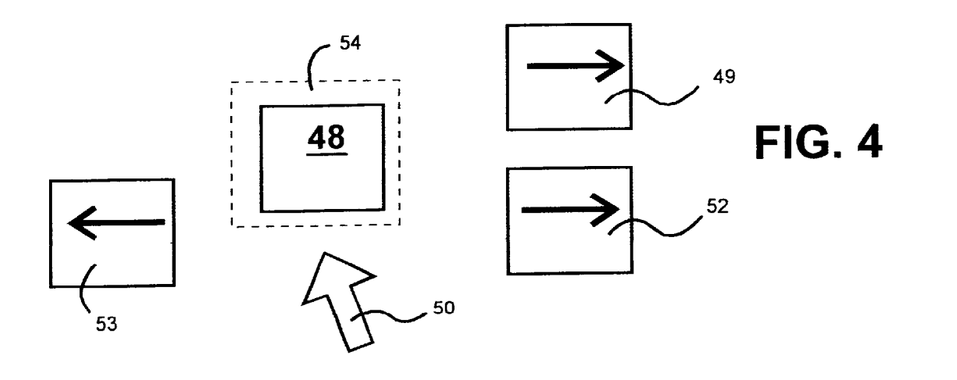
FIG. 4 is the magnified view of FIG. 3 illustrating how the three adjacent icons within the approached icon halo are moved out of the halo to thereby provide the user with a clear view of the approached icon.

In FIG. 2, cursor 50 approaches icon 48. Icons 49, 52 and 53 are all within the halo 54 of approached icon 48. Thus, they are too close and are likely to interfere with the user selection of icon 48. A magnified view of this state is shown in FIG. 3. Thus, as shown in FIG. 4, adjacent icons 49, 52 and 53 are temporarily automatically moved away from approached icon 48 so that they are positioned outside of halo 54 to clearly expose icon 48, thereby enabling user selection. The process may be set up to return icons 49, 52 and 53 to their initial positions after a user selection of icon 48, after the user moves past icon 48 without selecting it of after a designated time period.

Figure 5:
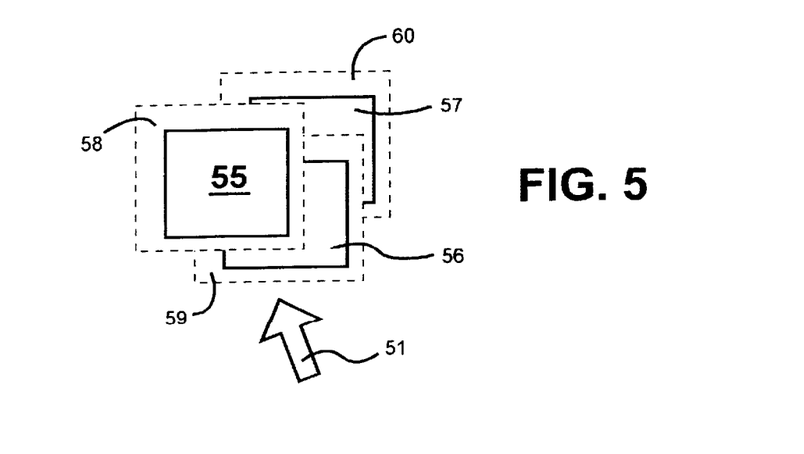
FIG. 5 is a magnified portion of the view of FIG. 2 illustrating the set of overlapping adjacent icons within the halo of an icon being approached by the cursor.

Now, with respect to cursor 51, FIG. 2, it has encountered three icons: 55, 56 and 57 with each positioned within each others' halos. With such a stacked or overlapping group of icons, a determination cannot be readily made as to which of the overlapped icons the user is approaching. It is, thus, preferred to sequentially move the adjacent icons away from each of the overlapping icons to thereby expose each icon and give the user an opportunity to select, as will be hereinafter described with respect to FIGS. 5 through 8. FIG. 5 is a magnified view of a portion of FIG. 2 showing overlapped icons 55 through 57 with their respective halos 58 through 60 being approached by cursor 51. Now, with respect to FIGS. 6 through 8, we will describe how the adjacent icons are moved out of the halo of each icon to thereby expose each icon in the overlapped stack for a viewer selection. First, FIG. 6, adjacent icons 56 and 57 are moved out of halo 58 of cursor 55. Then, FIG. 7, adjacent icons 55 and 57 are moved out of halo 59 of cursor 56. Lastly, FIG. 8, adjacent icons 55 and 56 are moved out of halo 60 of icon 57. This exposes each of the icons in the stack for a user selection. Here again, the process may be set up to return the moved icons to their original positions either after a user selection of an icon, the passage of a predetermined time period or if the user moves beyond the stack without making a selection.

Figure 6:
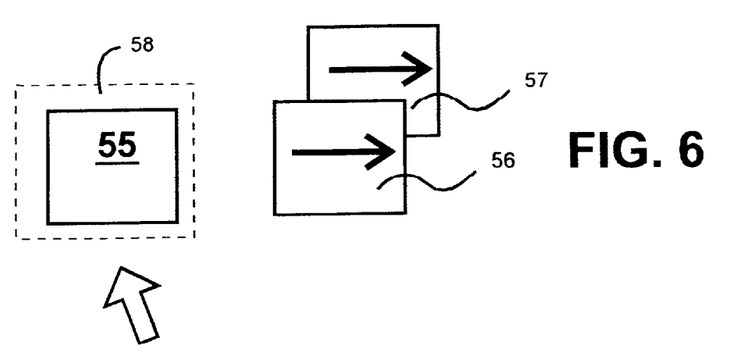
FIG. 6 is the view of overlapping icons of FIG. 5 illustrating the moving away of adjacent icons to expose the first icon in the set.
Figure 7:
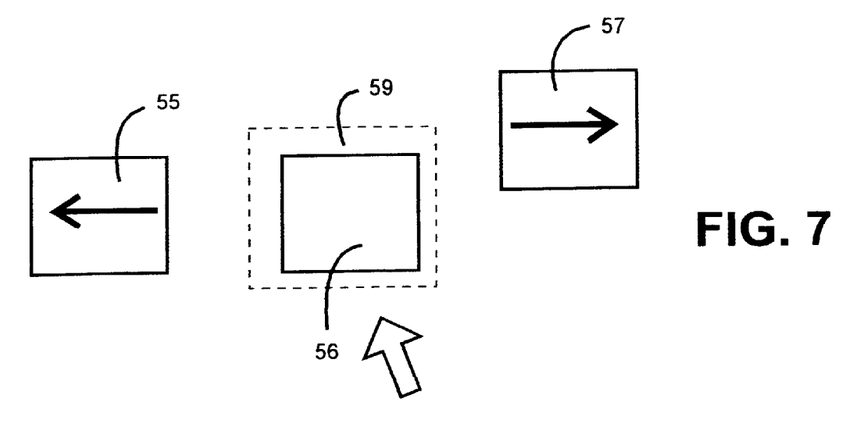
FIG. 7 is the view of overlapping icons of FIG. 5 illustrating the moving away of adjacent icons to expose the second icon in the set.
Figure 8:
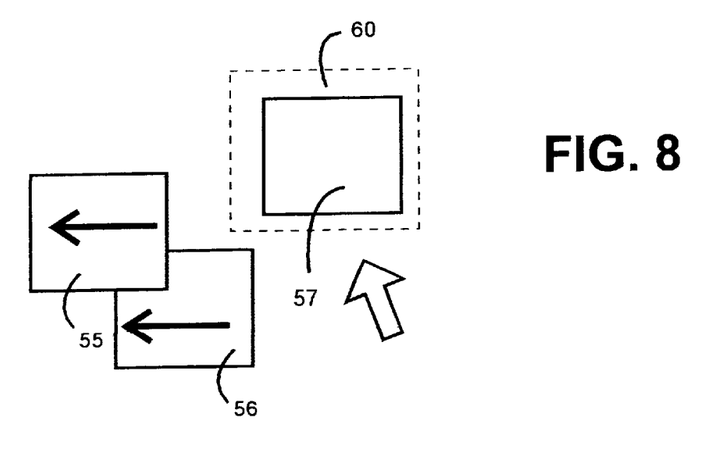
FIG. 8 is the view of overlapping icons of FIG. 5 illustrating the moving away of adjacent icons to expose the third icon in the set.

In the sequence of highlighting shown in FIGS. 6 through 8, the cursor 51 is shown to be in the initial position during the sequential uncovering or exposure of each of icons 55 through 57 by moving the other icons away. The sequential icon exposure process may be set up to proceed automatically, i.e. as soon as it determined that cursor 51 is nearing at least one of the icon halos, and that there is insufficient separation in the cluster of icons, for cursor 51 to select a target icon from icons 55 through 57, the exposure sequence is automatically stepped through. Also, because of the closeness of the separation, each icon is preferably only activated, i.e. enabled, for selection during its exposure. Thus, the cursor 51 may remain stationary during the highlighting sequence and, when the user sees that his target icon is exposed, he clicks on an appropriate mouse button to make the selection. Also, the sequential exposure process need not be automatic. A first icon in the cluster or set may be exposed, e.g. the icon closest to the cursor. The user may then select it by clicking on one of his mouse buttons or step to expose the next icon in the sequence by clicking on the other of his mouse buttons. The user may also sequentially step through the sequential exposure of the icons in the cluster or set by moving his cursor 51 so that the cursor is sequentially closest to each of the icons in the cluster and that closest icon is thereby exposed by moving the other icons in the cluster away. Since only the exposed icon is enabled for selection, the user need not be concerned with touching his target icon to make a selection; he need only click on his mouse to select the icon during the time period that the icon is exposed.

Figure 9:
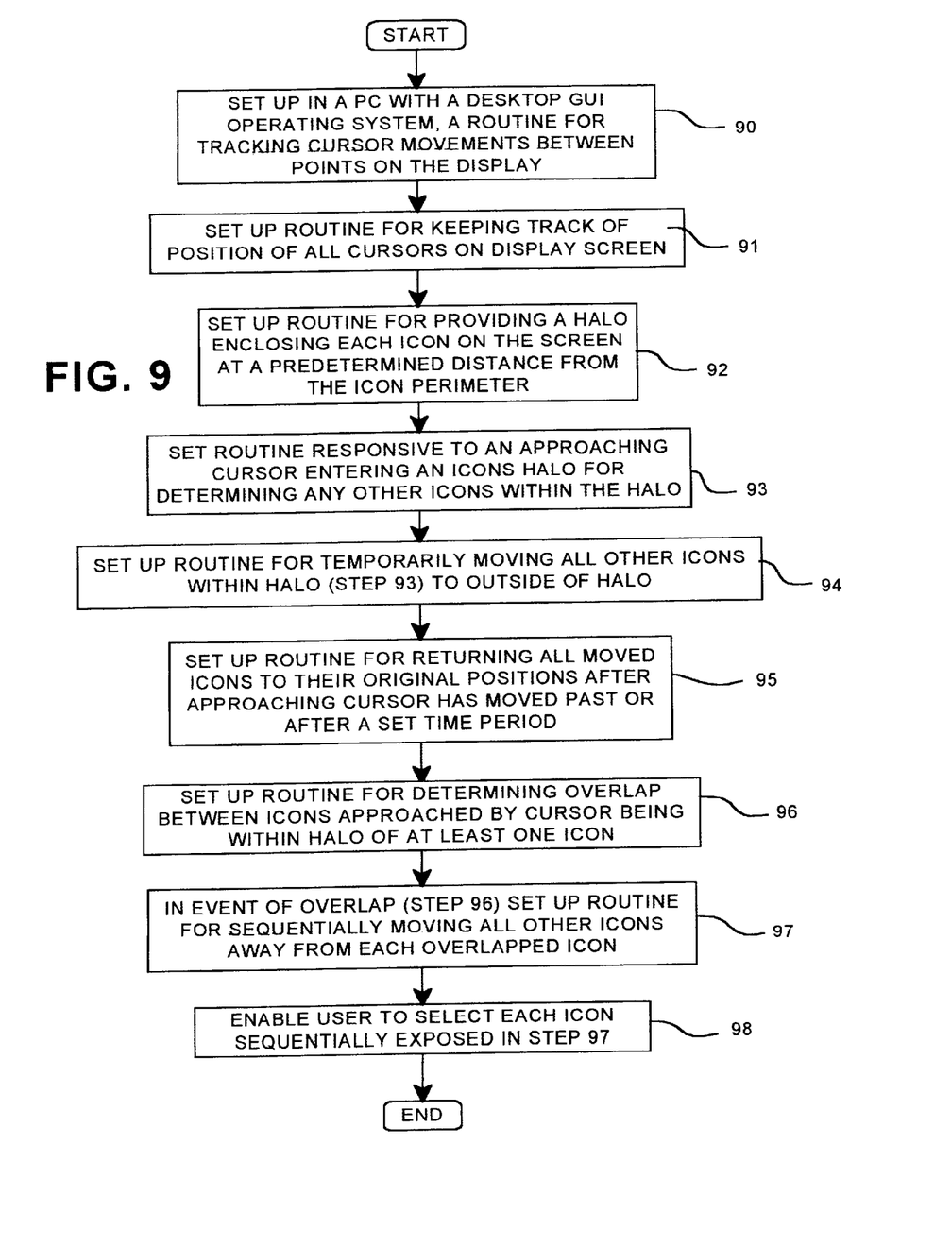
FIG. 9 is a flowchart of the program steps involved in setting up a process wherein cursor movement into regions on a display screen with high icon density results in the moving of adjacent icons within the halo of an approached icon.
Figure 10:
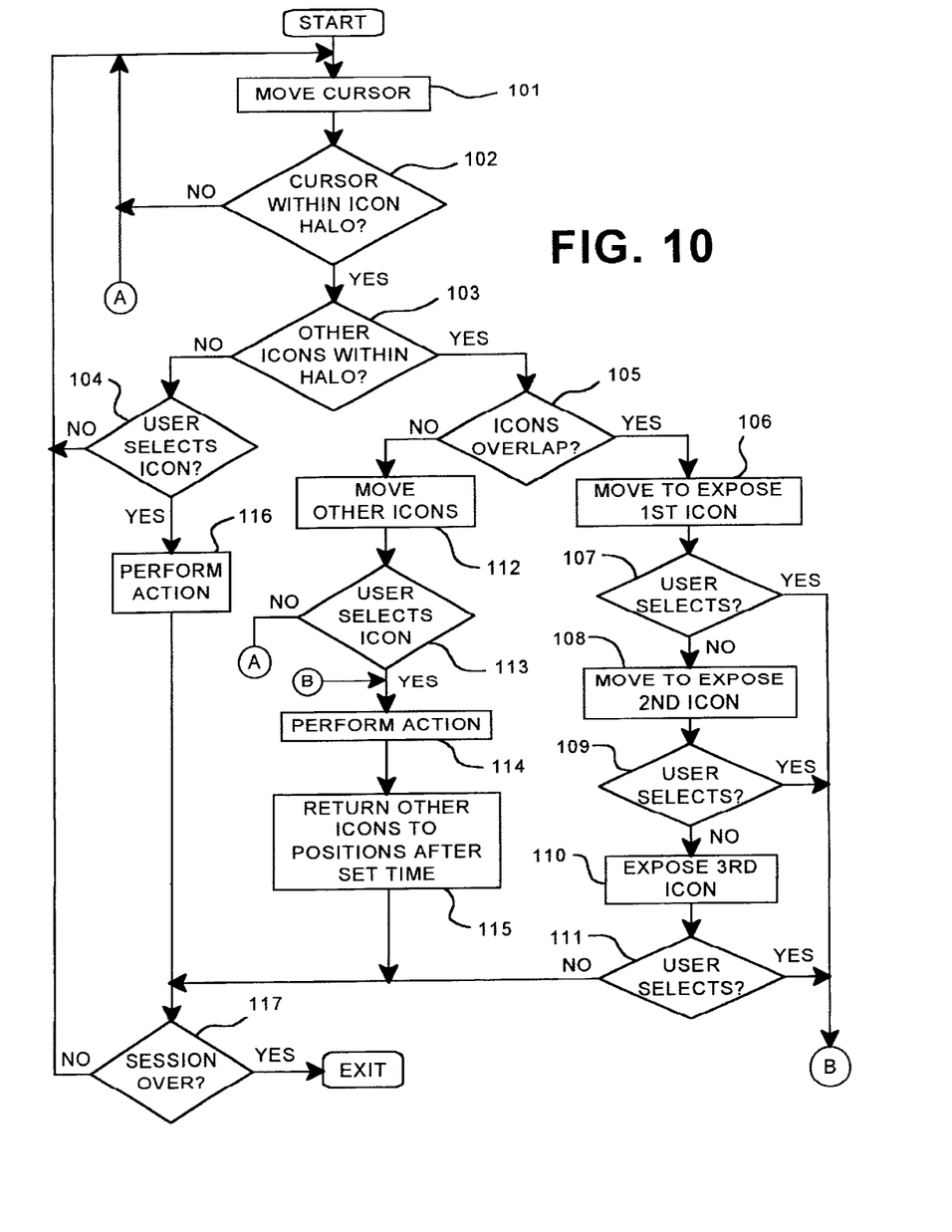
FIG. 10 is a flowchart of the steps involved in an illustrative run of the process set up in FIG. 9.

Now, with reference to FIGS. 9 and 10, we will describe a process implemented by the present invention in conjunction with the flowcharts of these figures. FIG. 9 is a flowchart showing the development of a process according to the present invention for distinguishing between closely spaced icons in a high icon density region of a display screen. In a personal computer set up with a desktop GUI and an operating system, a routine is provided for tracking cursor movements between points on a display screen, step 90. A routine is provided for tracking cursor positions on the display screen, step 91. A routine is set up for providing a halo enclosing each of the icons on the screen at a predetermined distance from the icon perimeter, step 92. A routine is set up responsive to an approaching cursor coming near or entering an icon's halo for determining whether there are any other adjacent icons within the halo, step 93. It should be noted that the routine of step 93 may be set up to commence when the approaching cursor is near the approached icon. Near may be defined as entering the approached icon's halo. On the other hand, near may be defined by a halo surrounding the point of the cursor which may be determined by a distance somewhat different from that of the icon halo distance. Cursor halo dimensions are described in detail in the above cross-referenced copending application Ser. No. 09/899,604.

A routine is set up for temporarily moving all adjacent icons within the halo of an approached icon to screen positions outside of the halo, step 94. Likewise, a routine is set up for returning all moved icons to their original positions after the cursor has moved past or after a set time period, step 95.

A routine is set up for determining whether there is overlap wherein icons being approached by the cursor being within a halo of at least one other icon, step 96. A routine is set up that in the event of such an overlap will move all other icons away from each of the icons in the overlapped stack, step 97. A routine is set up, step 98, to enable the user to select each of the icons sequentially exposed in step 97.

The running of the process will now be described with respect to FIG. 10. First, step 101, the cursor is moved in the direction of an icon that the user wishes to select. A determination is made with respect to the moving cursor as to whether it is near or within the halo of an icon, step 102. If No, the process is returned to step 101 and the movement of the cursor continues. If the decision from step 102 is Yes, then step 103, a determination is made as to whether there are any adjacent icons within the halo of the approached icon. If No, a determination is made, step 104, as to whether the user has selected the icon. If Yes, step 116, the action represented by the icon is performed. If No, movement continues conventionally. A No indicates that the cursor is not moving in a dense cursor region of the display screen, as discussed hereinabove, and cursor movement, step 101, continues. If there is a Yes decision from step 103, i.e. there are other adjacent icons within the halo of the approached icon, then a determination is made as to whether there is any overlap between the approached icon and other icons, step 105. If No, then the adjacent icons are moved beyond the halo of the approached icon, step 112, and a determination is made as to whether the user has selected the icon, step 113. If No, the process is returned via branch "A" to step 101 where the cursor is moved again. If Yes, the user selects the exposed icon, then, step 114, the appropriate action represented by the icon is performed, step 114. The moved icons are then returned to their original positions after a set time, step 115, irrespective of whether the user has selected the exposed icon. On the other hand, if the determination from step 105 had been Yes, there is overlap between the approached icon and icons in the halo, then, as shown in FIGS. 6 through 8, the following steps are carried out. The first overlapping icon is exposed by moving the adjacent icons away, step 106, and a determination is made, step 107, as to whether the user selects the first icon. If Yes, then the function represented by the icon is performed via branch "B" to step 114. If No, then the second overlapping icon is exposed by moving the adjacent icons away, step 108, and a determination is made, step 109, as to whether the user selects the first icon. If Yes, then the function represented by the icon is performed via branch "B" to step 114. If No, then the third overlapping icon is exposed by moving the adjacent icons away, step 110, and a determination is made, step 111, as to whether the user selects the first icon. If Yes, then, the function represented by the icon is performed via branch "B" to step 114. If the decision from step 111 is No, or in any event after steps 115 or 116, a determination may conveniently be made as to whether we are at the end of the session, step 117. If Yes, the session is exited. If No, the process is returned to step 101 where the cursor continues to move as described above.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display system, a display interface implementation for directing a user's attention to specific selectable items on a display screen with crowded selectable items comprising;

user controlled means for moving an on-screen pointer to approach said selectable items;

means for determining if a selectable item being approached by said on-screen pointer is within a predetermined distance from at least one adjacent item; and means responsive to said determining means for moving any adjacent item within said predetermined distance to a display screen position beyond said predetermined distance.

2. The computer controlled user interactive display system of claim 1 wherein said selectable items are icons.

3. The computer controlled user interactive display system of claim 2 further including means for returning any moved adjacent icon to its initial position when said pointer moves beyond said approached selectable icon.

4. The computer controlled user interactive display system of claim 2 further including means for returning any moved adjacent icon to its initial position after a predetermined period of time.

5. The computer controlled user interactive display system of claim 4 wherein a plurality of said adjacent icons are moved and returned.

6. The computer controlled user interactive display system of claim 5 wherein said adjacent icons and selectable icons overlap each other, and further including means for user selection of an icon comprising:

means for sequentially moving all other icons away from each of the overlapping icons for said predetermined period of time to thereby expose each of the overlapping icons; and means for sequentially enabling the user selection of each exposed icon.

7. A method for directing a user's attention to specific selectable items on a display screen with crowded selectable items in computer controlled user interactive display systems comprising:

moving an on-screen pointer to approach said selectable items;

determining if a selectable item being approached by said on-screen pointer is within a predetermined distance from at least one adjacent item; and moving any adjacent item determined to be within said predetermined distance to a display screen position beyond said predetermined distance.

8. The method of claim 7 wherein said selectable items are icons.

9. The method of claim 8 further including the step of returning any moved adjacent icon to its initial position when said pointer moves beyond said approached selectable icon.

10. The method of claim 8 further including the step of returning any moved adjacent icon to its initial position after a predetermined period of time.

11. The method of claim 10 wherein a plurality of said adjacent icons are moved and returned.

12. The method of claim 11 wherein said adjacent icons and selectable icons overlap each other, and further including a method for user selection of an icon comprising:

sequentially moving all other icons away from each of the overlapping icons for said predetermined period of time to thereby expose each of the overlapping icons; and sequentially enabling the user selection of each exposed icon.

13. A computer program having program code included on a computer readable medium for directing a user's attention to specific selectable items on a display screen with crowded selectable items in computer controlled user interactive display systems comprising:

user controlled means for moving an on-screen pointer to approach said selectable items;

means for determining if a selectable item being approached by said on-screen pointer is within a predetermined distance from at least one adjacent item; and means responsive to said determining means for moving any adjacent item within said predetermined distance to a display screen position beyond said predetermined distance.

14. The computer program of claim 13 wherein said selectable items are icons.

15. The computer program of claim 14 further including means for returning any moved adjacent icon to its initial position when said pointer moves beyond said approached selectable icon.

16. The computer program of claim 14 further including means for returning any moved adjacent icon to its initial position after a predetermined period of time.

17. The computer program of claim 16 wherein a plurality of said adjacent icons are moved and returned.

18. The computer program of claim 17 wherein said adjacent icons and selectable icons overlap each other, and further including means for user selection of an icon comprising:

means for sequentially moving all other icons away from each of the overlapping icons for said predetermined period of time to thereby expose each of the overlapping icons; and means for sequentially enabling the user selection of each exposed icon.

19. In a computer controlled user interactive display system, a display interface implementation for directing a user's attention to specific selectable items on a display screen with crowded selectable items comprising;

user controlled means for moving an on-screen pointer to approach a cluster of said selectable items;

means for determining whether the items in said cluster have sufficient separation for said pointer to select separate items in said cluster; and means responsive to a determination of insufficient separation for sequentially uncovering each item in said cluster by moving the other items in said cluster away from each item.

20. The computer controlled user interactive display system of claim 19 wherein each item is activated for selection when uncovered.

21. A method for directing a user's attention to specific selectable items on a display screen with crowded selectable items in computer controlled user interactive display systems comprising:

moving an on-screen pointer to approach a cluster of said selectable items;

determining whether the items in said cluster have sufficient separation for said pointer to select separate items in said cluster; and sequentially uncovering each item in said cluster by moving the other items in said cluster away from each item responsive to a determination that there is insufficient separation.

22. The method of claim 21 wherein each item is activated for selection when each item is sequentially uncovered.

23. A computer program having program code included on a computer readable medium for directing a user's attention to specific selectable items on a display screen with crowded selectable items in computer controlled user interactive display systems comprising:

user controlled means for moving an on-screen pointer to approach a cluster of said selectable items;

means for determining whether the items in said cluster have sufficient separation for said pointer to select separate items in said cluster; and means responsive to a determination of insufficient separation for sequentially uncovering each item in said cluster by moving the other items in said cluster away from each item.

24. The computer program of claim 23 wherein each item is activated for selection when uncovered.

* * * * *